(12) United States Patent
Xing et al.

(10) Patent No.: US 9,684,473 B2
(45) Date of Patent: *Jun. 20, 2017

(54) VIRTUAL MACHINE DISASTER RECOVERY

(71) Applicant: EMC IP Holding Company LLC, Hopkinton, MA (US)

(72) Inventors: Jian Xing, Pleasanton, CA (US); Christopher Hercules Claudatos, San Jose, CA (US); Mandavilli Navneeth Rao, Santa Clara, CA (US); Michael John Dutch, Los Gatos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,357

(22) Filed: Jul. 6, 2016

(65) Prior Publication Data

US 2016/0313925 A1   Oct. 27, 2016

Related U.S. Application Data

(63) Continuation of application No. 14/569,526, filed on Dec. 12, 2014, now Pat. No. 9,411,691, which is a continuation of application No. 13/174,681, filed on Jun. 30, 2011, now Pat. No. 8,949,829.

(51) Int. Cl.
    *G06F 9/455*    (2006.01)
    *G06F 3/06*     (2006.01)
    *G06F 11/14*    (2006.01)

(52) U.S. Cl.
    CPC .............. *G06F 3/065* (2013.01); *G06F 3/064* (2013.01); *G06F 3/0619* (2013.01); *G06F 3/0664* (2013.01); *G06F 3/0683* (2013.01); *G06F 9/45558* (2013.01); *G06F 11/1453* (2013.01); *G06F 11/1469* (2013.01); *G06F 2009/45562* (2013.01); *G06F 2009/45575* (2013.01); *G06F 2201/815* (2013.01); *G06F 2201/84* (2013.01)

(58) Field of Classification Search
    None
    See application file for complete search history.

(56) References Cited

U.S. PATENT DOCUMENTS

| | | | |
|---|---|---|---|
| 5,649,196 A | 7/1997 | Woodhill et al. | |
| 6,668,262 B1 | 12/2003 | Cook | |
| 7,734,595 B2 | 6/2010 | Margolus | |
| 8,458,392 B2 * | 6/2013 | Gao | G06F 9/45537 711/162 |
| 2003/0220903 A1 | 11/2003 | Mont | |
| 2004/0172574 A1 * | 9/2004 | Wing | G06F 11/2025 714/4.12 |
| 2006/0259527 A1 | 11/2006 | Devarakonda | |
| 2008/0208927 A1 | 8/2008 | Chikusa et al. | |
| 2009/0222496 A1 * | 9/2009 | Liu | G06F 3/0482 |
| 2010/0076934 A1 | 3/2010 | Pershin | |

(Continued)

*Primary Examiner* — Gregory A Kessler
(74) *Attorney, Agent, or Firm* — Van Pelt, Yi & James LLP

(57) ABSTRACT

A method, article of manufacture, and apparatus for protecting data. In some embodiments, this includes creating a copy of a backup virtual machine on a deduplicated data storage device, registering the copy with a virtual environment manager, operating a virtual machine based on the copy and storing changes made during operation of the virtual machine to the copy.

25 Claims, 7 Drawing Sheets

(56) References Cited

U.S. PATENT DOCUMENTS

2010/0257523 A1* 10/2010 Frank ................ G06F 9/45558
718/1
2010/0325191 A1* 12/2010 Jung ..................... G06F 15/16
709/202
2011/0307657 A1    12/2011 Timashev

* cited by examiner

VIRTUAL MACHINE DISASTER RECOVERY

CROSS REFERENCE TO RELATED APPLICATIONS

This application is a continuation of co-pending U.S. patent application Ser. No. 14/569,526, entitled VIRTUAL MACHINE DISASTER RECOVERY filed Dec. 12, 2014 which is incorporated herein by reference for all purposes, which is a continuation of U.S. patent application Ser. No. 13/174,681, now U.S. Pat. No. 8,949,829, entitled VIRTUAL MACHINE DISASTER RECOVERY filed Jun. 30, 2011 which is incorporated herein by reference for all purposes.

FIELD OF THE INVENTION

This invention relates generally to processing data, and more particularly to systems and methods for protecting data.

BACKGROUND OF THE INVENTION

Virtualized computing environments are becoming increasingly popular due to their efficient use of hardware, ease of IT-management, and reduced operating costs. As with physical computing environments, data in virtualized computing environments also needs to be protected.

Protecting data in virtualized computing environments presents challenges that are not encountered in physical computing environments. Conventional methods to protect data in virtual environments typically include taking an image of a virtual disk and storing the image in a remote location.

However, such methods may take considerable time and resources to complete. As the amount of data that needs to be backed up or restored increases, the problem of efficiently protecting data is becoming more profound.

There is a need, therefore, for an improved method, article of manufacture, and apparatus for protecting data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
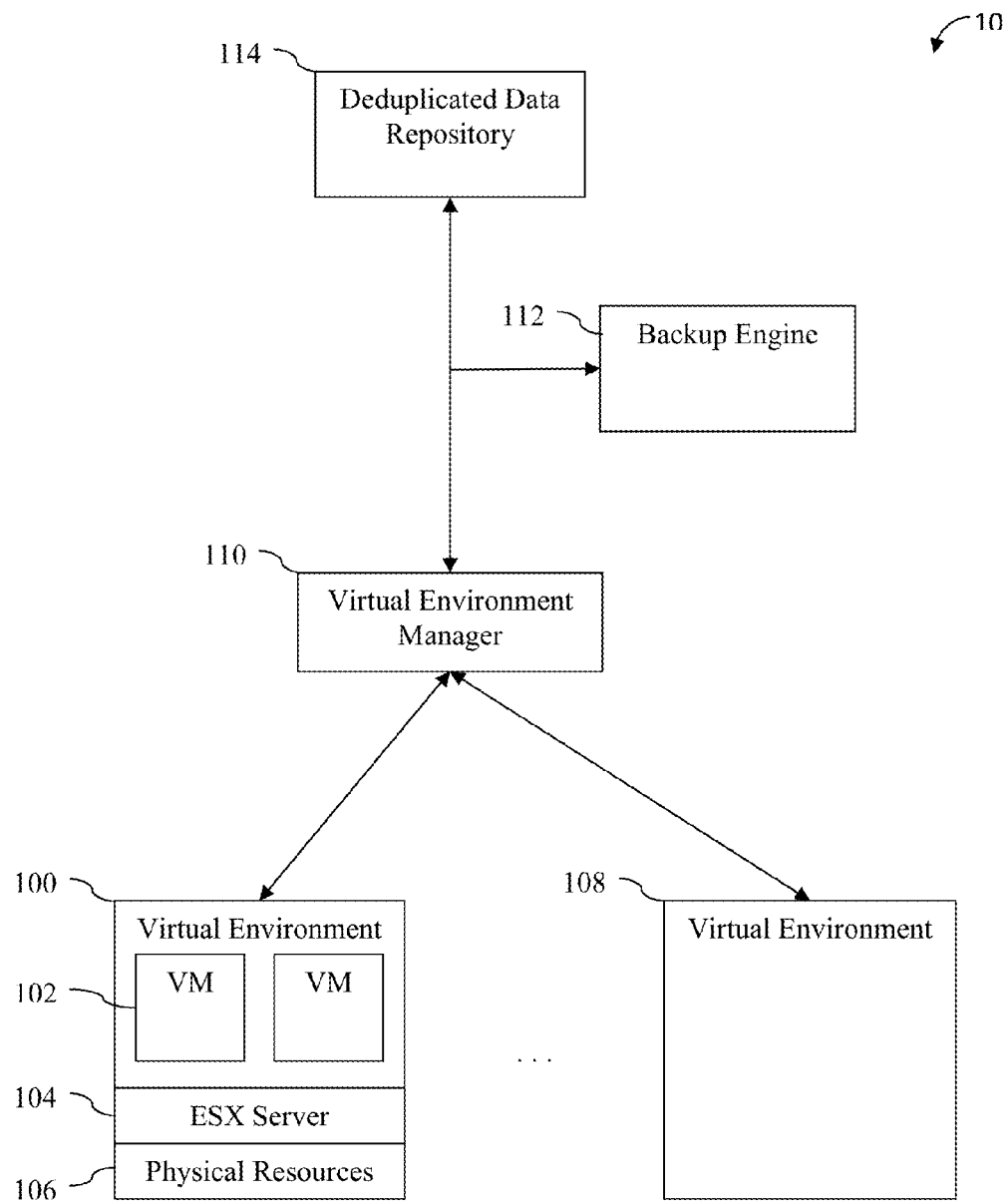
FIG. 1 illustrates a data system in accordance with some embodiments.

FIG. 1 illustrates a data system in accordance with some embodiments. Data system 10 may include one or more virtual environments, as illustrated by Virtual Environments 100 and 108. In some embodiments, Virtual Environment 100 may be a vSphere environment, a product offered by VMWare. A virtual environment may include one or more virtual machines (VMs) as illustrated by VMs 102. A virtual environment may also include an ESX server, a product offered by VMWare. A virtual environment also includes Physical Resources 106. Physical Resources 106 may be local hard disks or remote resources, such as storage area networks (SAN) or use a Network File System (NFS) protocol. VMs 102 may be different operating environments. For example, in some embodiments, VM 102 may be a virtual Windows machine. In some embodiments, VM 102 may be a virtual Linux machine. Virtual Environment Manager 110 manages one or more virtual environments. In some embodiments, a virtual environment maanger may be vCenter, a product offered by VMWare. Data from a virtual environment, or a VM, may be backed up to Deduplicated Data Repository 114. In some embodiments, Data Domain back products, offered by EMC Corporation, may be used. Backup Engine 112 may be an application to perform or orchestrate backup operations from the virtual environments to the deduplicated data repository. In some embodiments, Backup Engine 112 may be Networker, a product offered by EMC Corporation.

It should be noted that although FIG. 1 illustrates a certain configuration of data system 10, other configurations are possible. For example, one of the physical resources of a virtual environment may be a deduplicated data repository. This may be helpful in cases of disaster recovery, as explained herein. In other words, Physical Resources 106 may be Deduplicated Data Repository 114.

By utilizing a virtual environment manager and a deduplicated data repository, backing up image of virtual images may be made more efficient. Virtual environment managers, such as vCenter, may take snapshots of VMs under their supervision. In some embodiments, these are Virtual Machine Disk (VMDK) files. Once the snapshot has been created, a backup engine may begin moving the snapshot to the deduplicated data repository. Due to the nature of the deduplicated data repository, redundant blocks of data do not need to be transmitted. For example, certain VMWare configuration files, such as .vmx files, rarely change in between backups. Since this data is usually the same, there is no need to re-transmit the data on subsequent backups, such as incremental backups. Further, since the virtual environment manager created a snapshot of a VM, the backed up image may also be used to start a VM directly. In other words, the deduplicated data repository contains a workable VM. In some embodiments, the backup engine may connect directly to the ESX server to receive VMDK files and other data required for a backup.

The deduplicated data repository and virtual environment manager also allow for efficient incremental backups. In addition to not transmitting redundant data on subsequent backups, the incremental backup may be treated as a whole image, as opposed to only a delta with conventional techniques. Virtual environment managers may keep track of which blocks, or data, changed during a time period. In some embodiments, this may be vCenter's Change Block Tracking (CBT) feature. Using this information, a backup engine may only transmit the changed blocks. However, instead of just storing the changed blocks, the features of a deduplicated data repository may be utilized.

Deduplicated data repositories may replicate data efficiently. Since replicated data is by definition redundant data, pointers to the same block(s) of data are created. Thus, whether a deduplicated data repository holds one copy of data, two copies of data, or twenty copies of data, the amount actually stored is almost the same (save the space required for pointers, and other overhead, etc.). Further, since these "duplicate" copies of data are small, it is relatively fast to generate them (as compared to copying data). This is especially true when the data set is large. For example, it may take little time to create pointers to a set of data that is 100 GB large, but it will take a considerable amount of time and computing resources to create an actual copy of that 100 GB data. In some embodiments, Data Domain Boost, a product offered by EMC Corporation, may be used to efficiently replicate data in a deduplicated data repository.

Thus, instead of just storing the changed blocks in the deduplicated data repository, a replicate data set can be created, and the changed blocks can be written to the replicate data set. This results in an independent full image, not just a delta. Further, the original data set stored in the deduplicated data repository (e.g., the original the replica was based off of) has not been modified, and may still be used for recovery processes.

Figure 4:
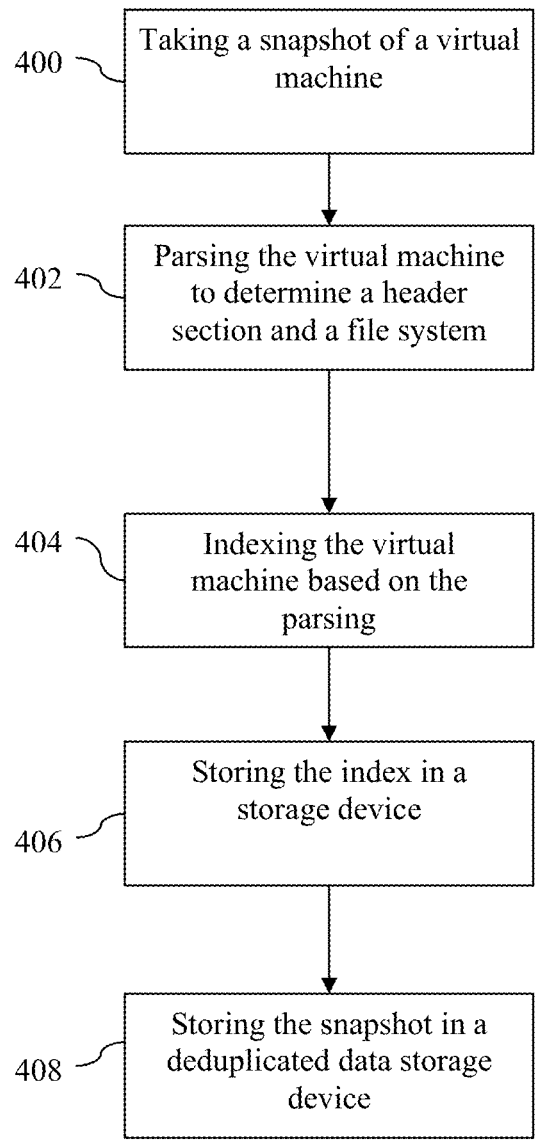
FIG. 4 illustrates a method to protect data in accordance with some embodiments.

FIG. 4 illustrates a method to protect data in accordance with some embodiments. In step 400, a snapshot of a virtual machine is taken. In step 402, the virtual machine is parsed to determine a header section and a file system. In step 404, the virtual machine is indexed based on the parsing. In step 406, the index is stored in a storage device. In step 408, the snapshot is stored in a deduplicated data storage device.

A VM may typically include several VMDK files. Once a VM or VMDK has been backed up to a deduplicated data repository, a user may want to retrieve one or more individual files from the backup. Typically, this has been accomplished by mounting the image, and browsing it as a local file system for the particular files(s). However, this may be an inefficient way of recovering individual files. For example, if a VMDK file 10 GB large, but a user only wanted a 1 KB file from it, mounting the entire VMDK would be a waste resources. Further, the user would have to wait for a 10 GB image to mount before being able to brose for the 1 KB file.

Figure 2:
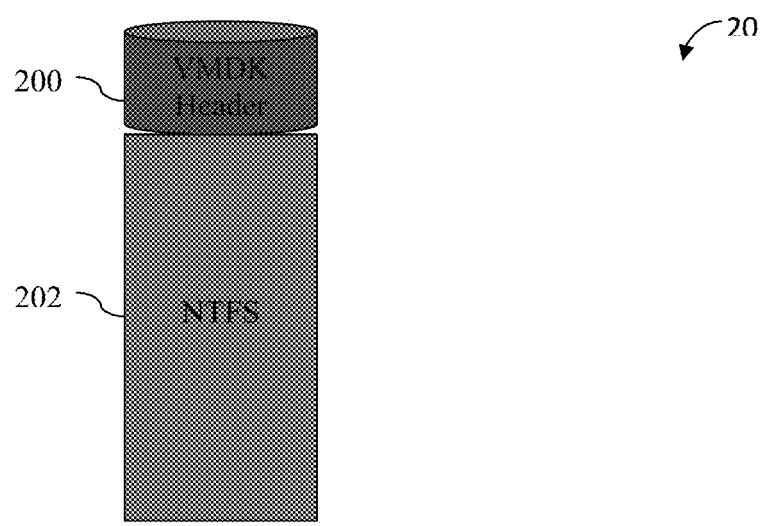
FIG. 2 illustrates a sample VMDK with a Windows file system.

Instead of mounting the VMDK, the enhanced techniques described herein parse a VMDK to index files in it. A VMDK can be broken down to two sections: A VMDK header, and a file system. The file system has the same layout as a normal file system under the native operating system. For example, if a VMDK included a Windows XP operating system, the file system would be same as a normal Windows XP operating system (e.g. NTFS file system). FIG. 2 illustrates a sample VMDK with a Windows file system. VMDK 20 includes two regions: the top is VMDK Header 200. The larger bottom is NTFS File System 202.

Since a VMDK header is well defined, it is possible to skip over the VMDK header and go straight to the file system. If the file system is a NTFS file system, the Master File Table (MFT) can be parsed to identify every file in the NTFS file system. In some embodiments, this includes reading the MFT and getting file attributes, and for non-resident files, getting an extent list. Resident files are files that reside in the MFT. Non-resident files are files that reside outside the MFT.

In some embodiments, a backup engine parses the full MFT, processes each file record in the table, and saves the file information in its database or index. When parsing the MFT, the backup engine saves the following information for each file record: File type (e.g. resident vs. non-resident), file record number (used to access the data for a resident file), time stamp, size of file, and a file extent list (used to access the data for non-resident files). In some embodiments, the index may be saved in the deduplicated data repository. In some embodiments, the index may be saved on the VM for ease of access. In some embodiments, the index may be stored locally to the backup engine. By pre-indexing the files during a backup process, a user will be able to identify individual files after the backup engine has completed the backup process. Thus, when a user wants to recover an individual file, a backup or recovery engine does not need to mount the entire VMDK to find the file. Rather, the index may be used to locate where in the VMDK the individual file resides. Since the deduplicated data repository has a full image of a VMDK file, the backup may also be parsed based on the information in the index (e.g. whether the individual file is a resident or nonresident file, and where in the file system the file is, etc.). In some embodiments, after isolating the part of the VMDK the individual file resides in, the backup or recovery engine may reconstruct the file on the deduplicated data repository, or may push it to an ESX server or individual VMs.

Figure 6:
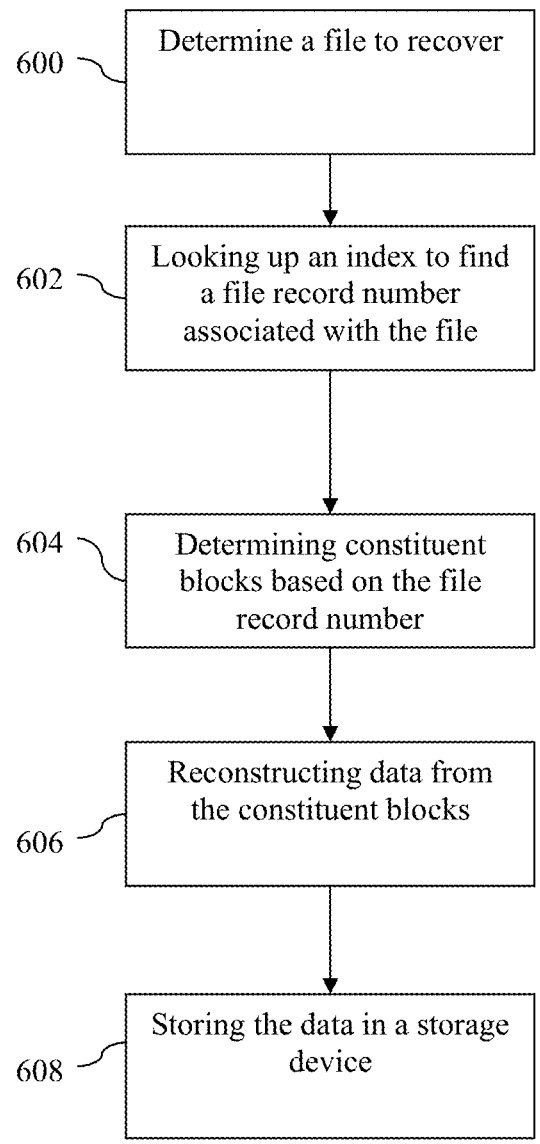
FIG. 6 illustrates a method to protect data in accordance with some embodiments.

FIG. 6 illustrates a method to protect data in accordance with some embodiments. In step 600, a file to recover is determined. In step 602, an index is looked up to find a file record number associated with the file. In step 604, constituent blocks are determined based on the file record number. In step 606, data is reconstructed from the constituent blocks. In step 608, the data is stored in a storage device. In some embodiments, the constituent blocks may be a subset of a VMDK image. In other words, the file to recover is stored as part of a VMDK image.

In some embodiments, if a user wanted to recover multiple resident files, it may be preferable to recover the whole MFT in memory and then recover each file based on file record number. If a user wanted to recover non-resident files, the backup engine may recover the file data extent list to determine where in the VMDK the files are, and use the deduplicated data repository's replication ability to quickly recover the file.

In some embodiments, it may not be preferable to parse the entire MFT. For example, when processing an incremental backup, it may be determined that very little data has changed (e.g. CBT identifies only a few changed blocks). However, the actually data set may be very large and contain a large number of files. Accordingly, the MFT may also be very large. It may be inefficient to parse the entire MFT when it can be inferred that only a few files have changed based on the CBT. Using the enhanced techniques described herein, it may be preferable to parse only the section of the MFT that changed.

Figure 3:
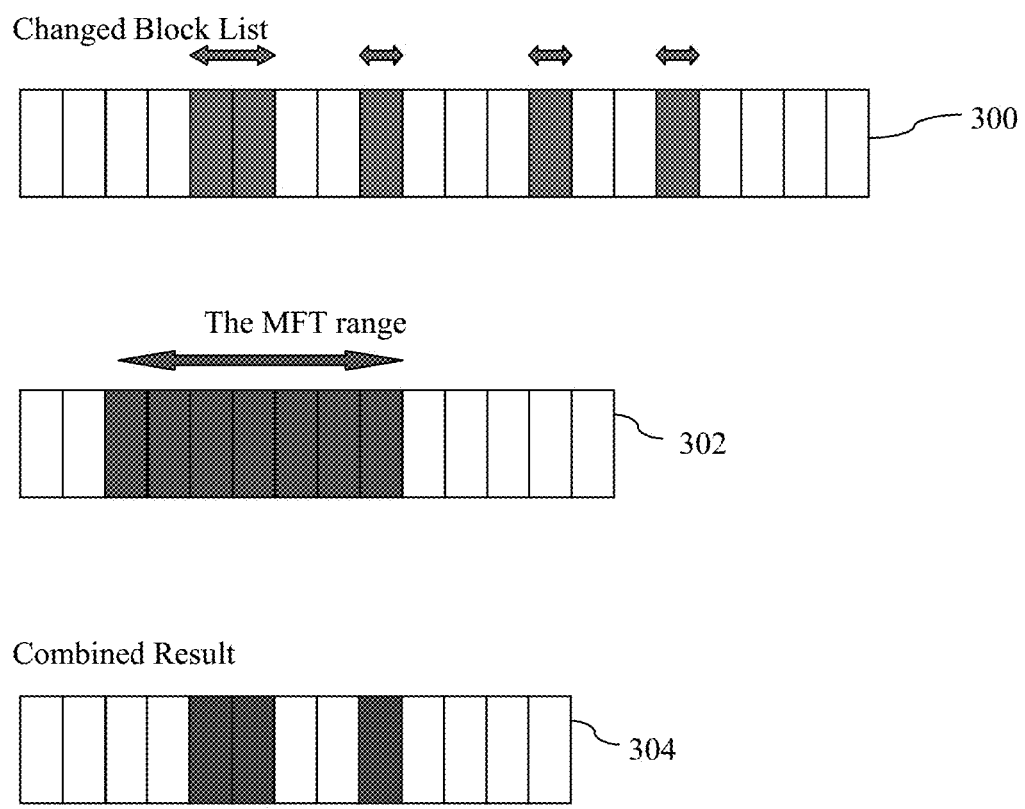
FIG. 3 illustrates three different views of a VMDK in accordance with some embodiments.

FIG. 3 illustrates three different views of a VMDK in accordance with some embodiments. VMDK View 300 shows a changed block list. The green blocks illustrate which blocks have changed. The white blocks illustrate blocks that have not changed. VMDK View 302 shows where in the VMDK the MFT resides. The range of the MFT may be determined by parsing the VMDK from its previous full backup to determine the start location, and an end location may be calculated based on the number of file records. Since the range of the MFT is known, and the changed block list is known (may be from vCenter), we can combine the two to determine which blocks in the MFT changed. This is illustrated by the red blocks in VMDK 304. Thus, during incremental backups, only the changed section of the MFT needs to be parsed. The changes may be detected and written to the index. The new index may be saved as a separate whole index (e.g not just a delta), or may overwrite the old index. This may result in considerable time and resource savings if the MFT is very large and the change is very small.

Figure 5:
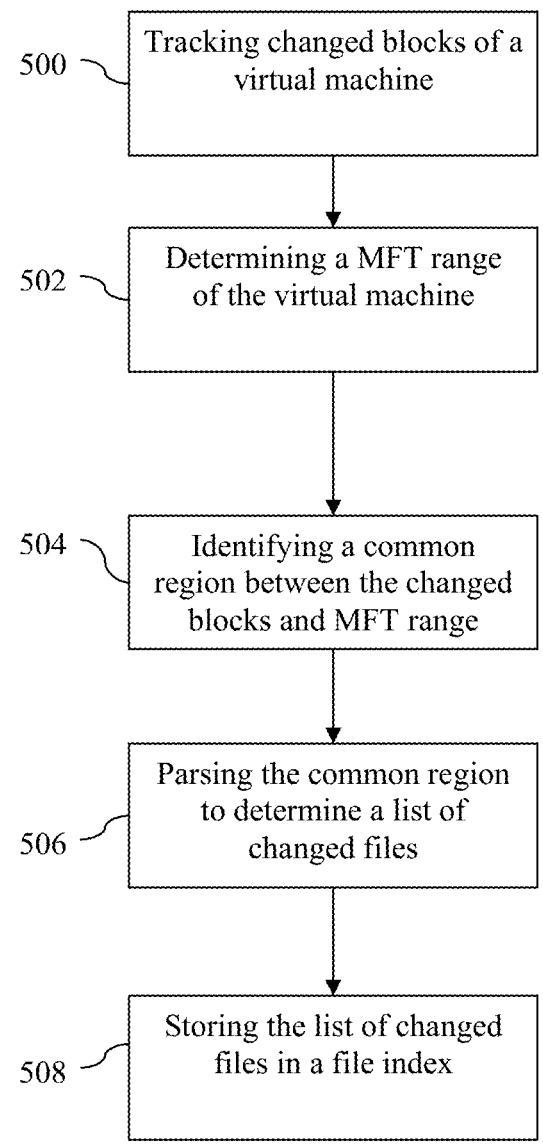
FIG. 5 illustrates a method to protect data in accordance with some embodiments.

FIG. 5 illustrates a method to protect data in accordance with some embodiments. In step 500, changed blocks of a virtual machine are tracked. In step 502, a MFT range of the virtual machine is determined. In step 504, a common region between the changed blocks and MFT range is identified. In step 506, the common region is parsed to determine a list of changed files. In step 508, the list of changed files is stored in an index. In some embodiments, the index may include a list of files of the virtual machine in a previous state (e.g. an earlier version of the backup).

In some embodiments, the deduplicated data repository is disk based. A disk may be preferable to tape in some embodiments, such as in the case of disaster recovery. For example, suppose a VM in a vSphere went down. Assuming the VM had been backed up to the disk based deduplicated data repository, a user may configure the ESX server via NFS to enable ESX access to all data on the repository. In other words, the storage in FIG. 1 may be configured to include the repository. Since the repository has both the configuration files and VMDK files saved with the original format during the backup, and each backup is an independent full backup, these backups may be registered with the virtual environment manager (or vCenter) to start a VM immediately on the repository.

Further, if a user did not wish to alter the original backup by performing operations on it, the replication features of the repository may be used to create a copy of the full backup. The copy may then be used to start the VM instead of the original, and all changes made during the operation of the VM will be made to the copy. The user may keep, delete, or migrate the new VM as needed after the VM has been registered with the virtual environment manager (vCenter).

Figure 7:
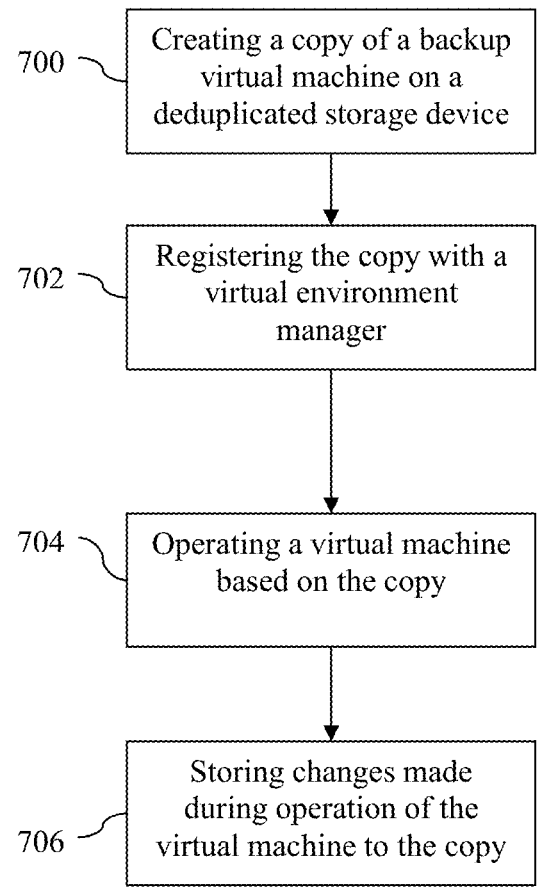
FIG. 7 illustrates a method to protect data in accordance with some embodiments.

FIG. 7 illustrates a method to protect data in accordance with some embodiments. In step 700, a copy of a backup virtual machine is created on a deduplicated data storage device. In step 702, the copy is registered with a virtual environment manager. In some embodiments, the virtual environment manager may be vCenter. In step 704, a virtual machine is operated based on the copy. In step 706, the changes made during operation of the virtual machine are stored to the copy. In some embodiments, operating the virtual machine includes connecting an ESX server to the deduplicated data storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for protecting data, the method comprising:
   creating a copy of a backup virtual machine on a data storage device;
   operating a virtual machine based on the copy, wherein the virtual machine is reconstructed using pointers associated with the backup virtual machine; and
   storing changes made to a virtual machine disk during operation of the virtual machine to the copy, wherein the virtual machine disk includes resident files of a master file table and non-resident files outside of the master file table, wherein the changes made to the virtual machine disk includes a list of changes to one or more resident files of the master file table.

2. The method of claim 1, wherein the creating the copy of the backup virtual machine includes creating pointers to the backup virtual machine.

3. The method of claim 1, further comprising registering the copy with a virtual environment manager.

4. The method of claim 3, wherein the virtual environment manager monitors data that changed during a time period.

5. The method of claim 1, wherein reconstruction of the virtual machine comprises locating one or more particular files to recover, isolating part of the backup virtual machine in which the one or more located files reside, and recover the one or more particular files.

6. The method of claim 1, wherein operating the virtual machine includes connecting an ESX server to the data storage device.

7. The method of claim 1, wherein the copy of the backup virtual machine is made in response to an indication to recover a virtual machine with which the backup virtual machine is associated.

8. The method of claim 7, wherein the backup virtual machine comprises a backup of the virtual machine to be recovered.

9. The method of claim 1, wherein the pointers associated with the backup virtual machine point to data associated with a subset of files to be recovered.

10. The method of claim 9, wherein the pointers are associated with data that has been deduplicated in connection with a backup process.

11. The method of claim 10, wherein the pointers are associated with data that has not changed during a time period.

12. The method as recited in claim 1, further comprising migrating the virtual machine to a destination system.

13. A system for protecting data, comprising a data storage device, and one or more processors configured to:
create a copy of a backup virtual machine on the data storage device;
operate a virtual machine based on the copy, wherein the virtual machine is reconstructed using pointers associated with the backup virtual machine; and
store changes made to a virtual machine disk during operation of the virtual machine to the copy, wherein the virtual machine disk includes resident files of a master file table and non-resident files outside of the master file table, wherein the changes made to the virtual machine disk includes a list of changes to one or more resident files of the master file table.

14. The system of claim 13, wherein to create the copy of the backup virtual machine includes creating pointers to the backup virtual machine.

15. The system of claim 13, wherein the one or more processors is further configured to register the copy with a virtual environment manager.

16. The system of claim 15, wherein the virtual environment manager monitors keeps track of data that changed during a time period.

17. The system of claim 13, wherein reconstruction of the virtual machine comprises locating one or more particular files to recover, isolating part of the backup virtual machine in which the one or more located files reside, and recover the one or more particular files.

18. The system of claim 13, wherein operating the virtual machine includes connecting an ESX server to the data storage device.

19. The system of claim 13, wherein the copy of the backup virtual machine is made in response to an indication to recover a virtual machine with which the backup virtual machine is associated.

20. The system of claim 19, wherein the backup virtual machine comprises a backup of the virtual machine to be recovered.

21. The system of claim 13, further comprising migrating the virtual machine to a destination system.

22. The system of claim 13, wherein the pointers associated with the backup virtual machine point to data associated with a subset of files to be recovered.

23. The system of claim 22, wherein the pointers are associated with data that has been deduplicated in connection with a backup process.

24. The system of claim 23, wherein the pointers are associated with data that has not changed during a time period.

25. A computer program product for protecting data, comprising a non-transitory computer-readable medium having program instructions embodied therein for:
creating a copy of a backup virtual machine on a data storage device;
operating a virtual machine based on the copy, wherein the virtual machine is reconstructed using pointers associated with the backup virtual machine; and
storing changes made to a virtual machine disk during operation of the virtual machine to the copy, wherein the virtual machine disk includes resident files of a master file table and non-resident files outside of the master file table, wherein the changes made to the virtual machine disk includes a list of changes to one or more resident files of the master file table.

* * * * *